United States Patent [19]
Pierce

[11] Patent Number: 5,802,558
[45] Date of Patent: Sep. 1, 1998

[54] METHOD AND APPARATUS FOR UPGRADING REPROGRAMMABLE MEMORY CONTENTS IN A PCMCIA CARD

[75] Inventor: Michael E. Pierce, Orangevale, Calif.

[73] Assignee: Intel Corporation, Santa Clara, Calif.

[21] Appl. No.: 746,155

[22] Filed: Nov. 6, 1996

Related U.S. Application Data

[63] Continuation of Ser. No. 315,912, Sep. 30, 1994, abandoned.

[51] Int. Cl.$^6$ .................. G06K 19/067; G06F 13/00; G06F 9/00
[52] U.S. Cl. .................. 711/115; 711/104; 711/147; 711/154; 711/163; 365/195
[58] Field of Search .................. 711/115, 147, 711/104, 163, 154; 365/195

[56] References Cited

U.S. PATENT DOCUMENTS

| | | | |
|---|---|---|---|
| 4,864,542 | 9/1989 | Oshima et al. | 365/189.01 |
| 5,293,424 | 3/1994 | Holtey et al. | 380/23 |
| 5,319,751 | 6/1994 | Garney | 711/115 |
| 5,329,491 | 7/1994 | Brown et al. | 365/185.33 |
| 5,377,353 | 12/1994 | Yamaguchi | 711/147 |
| 5,388,248 | 2/1995 | Robinson et al. | 365/52 |
| 5,406,064 | 4/1995 | Takahashi | 235/492 |
| 5,410,714 | 4/1995 | Yorimoto et al. | 395/750 |
| 5,436,621 | 7/1995 | Macko et al. | 340/825.44 |
| 5,448,710 | 9/1995 | Liu | 711/172 |
| 5,491,827 | 2/1996 | Holtey | 711/163 |
| 5,519,851 | 5/1996 | Bender et al. | 395/500 |
| 5,537,654 | 7/1996 | Bedingfield et al. | 395/834 |
| 5,542,082 | 7/1996 | Solhjell | 711/115 |
| 5,572,683 | 11/1996 | Epolite et al. | 395/284 |
| 5,638,530 | 6/1997 | Pawate et al. | 711/115 |

OTHER PUBLICATIONS

Personal Computer Memory Card International Association, PCMCIA Standards, Release 2.01, Nov. 1992, pp. 1–1 through A–6.

*Primary Examiner*—Eddie P. Chan
*Assistant Examiner*—Hong C. Kim
*Attorney, Agent, or Firm*—Blakely, Sokoloff, Taylor & Zafman

[57] ABSTRACT

An apparatus and a method for upgrading the memory contents of a removable computer card in a computer system. The computer card includes a specialized random access memory and circuitry that allows the computer system read only access to the contents of a first portion of the specialized random access memory device during normal operations. To upgrade the contents in the specialized random access memory, the circuitry allows the computer system write access privileges to the entire random access memory device. The computer card also includes a microcontroller which controls read and write access requests by the computer system to the specialized random access memory device. The microcontroller is placed in a reduced power consumption state when the computer system is performing read only access to the specialized random access memory device so that overall power consumption by the card in the computer system is reduced.

25 Claims, 4 Drawing Sheets

FIG_1

FIG_2

FIG_3 (PRIOR ART)

FIG_4

FIG_5

FIG_6

FIG_7

FIG_8

METHOD AND APPARATUS FOR UPGRADING REPROGRAMMABLE MEMORY CONTENTS IN A PCMCIA CARD

This is a Continuation application of application Ser. No. 08/315,912, filed Sep. 30, 1994 now abandoned.

BACKGROUND OF THE INVENTION

1. Field of the Invention

The present invention relates to the field of computer systems. More specifically, the present invention relates to removable circuit cards for computer systems that comply with the Personal Computer Memory Card International Association standards.

2. Description of Related Art

The proliferation of portable computer systems, such as notebooks, subnotebooks, and palmtops, has prompted a tremendous demand for removable credit card sized Personal Computer Memory Card International Association (PCMCIA) cards. The PCMCIA cards are being used for everything from memory, modem/fax, local area networks, sound, disk drives, to many other applications.

In addition to their small size, the PCMCIA cards do not have configuration jumpers like conventional circuit cards. The absence of jumpers means that a PCMCIA card user does not have to wade through innumerable jumper options to configure the card to work properly in the underlying host computer.

The PCMCIA cards are automatically configured upon startup by the host computer's basic input/output system (BIOS) using configuration information residing in configuration registers in the PCMCIA card. The information in the configuration registers typically occupies about 100 bytes and is referred to as the Card Information Structure (CIS). The CIS includes configuration information such as the configuration parameters needed by the host computer to correctly configure the PCMCIA card to properly interface with the host computer, the type of card (e.g., modem/fax, local area networks), the power requirements for the card, the data transfer rate and any other pertinent information needed by the host to enable the PCMCIA card to properly function in the host computer. The CIS is stored in a memory array device such as a random access memory (RAM), a flash electrical erasable programmable read only memory (FLASH), or a read only memory (ROM) located in the PCMCIA card, and is accessible by the host computer using memory accesses defined by the PCMCIA standards.

Figure 3:
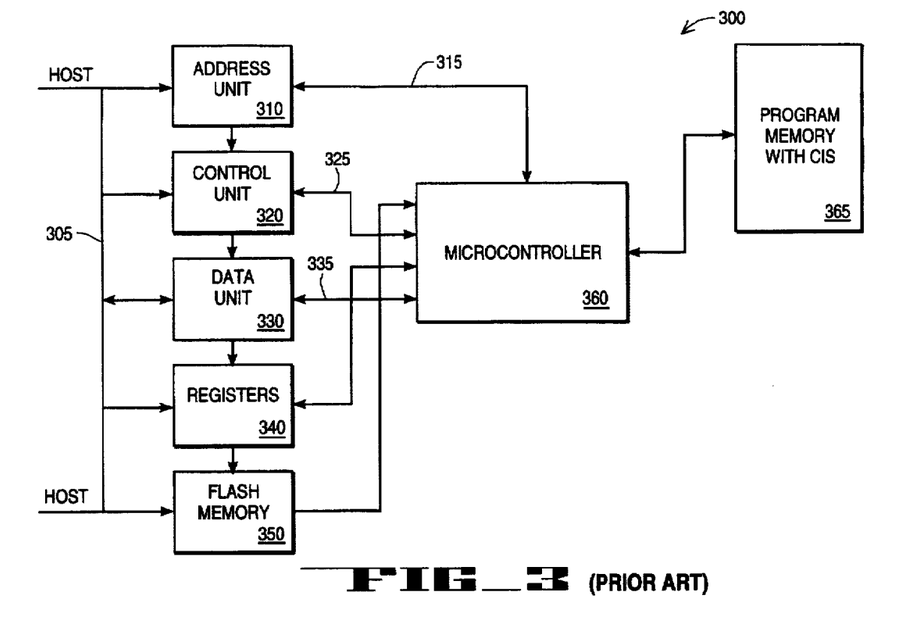
FIG. 3 is a block diagram illustrating a prior art system implementation of the Card Information Structure (CIS) of a PCMCIA card.

FIG. 3 is a block diagram of one embodiment of a prior art PCMCIA card, usually referred to as the mailbox method. As illustrated, the prior art PCMCIA card 300 includes an address unit 310 for generating address signals to a microcontroller 360, a control unit 320 for generating control signals to the microcontroller 360, a data unit 330 for driving data to the microcontroller 360, a register unit 340 for storing control data for the microcontroller 360, the microcontroller 360 for controlling access requests by the host computer to the CIS information, and a separate program memory array device 365 to store the CIS information. The PCMCIA card 300 also includes a flash memory 350 which may be optional in some prior art systems.

In the prior art system illustrated, the address unit 310, the control unit 320, and the data unit 330 are specific to individual card functions and although functionally similar, each unit may vary in capacity from one card to another. For example, the data unit 330 for a modem card is 8 bits wide, while the data unit for a local area network card is 16 bits wide.

As illustrated in FIG. 3, the address unit 310 communicates directly with the microcontroller 360 via address lines 315 by submitting address requests received from a host computer to the microcontroller 360 to access memory locations in the program memory 365 which contains the CIS. The microcontroller 360 also communicates with the control unit 320 via control lines 325 to control and monitor memory access requests from the host computer to the program memory device 365.

The data unit 330 supplies the data from the host computer to the microcontroller 360 via data lines 335, and data from the microcontroller 360 is transmitted through the data unit 330 to the host computer 100 via bus 305. In the prior art implementation of the PCMCIA card illustrated in FIG. 3 the microcontroller 360 executes instructions received from the host computer by execution of a sequence of corresponding instructions stored in program memory device 365, therefore, microcontroller 360 is continuously powered up to perform operations required to support the PCMCIA operations. Therefore, the PCMCIA card 300 consumes a relatively large amount of power in the host computer because the microcontroller is continuously in a powered-up state.

In addition to the relatively substantial power consumption of the above described prior art system, prior art implementations of the CIS have additional drawbacks such as cost, the need for extra hardware, delays in requesting and retrieving data, and the need for extra system board space. For example, if the CIS is stored in the flash memory devices, the flash memory is relatively expensive and also requires software separate from the PCMCIA card's main software to be maintained through out the life of the card to support the flash memory.

The system described in FIG. 3 also has the drawback of imposing significant delays in the request and retrieval of data for the host computer from the program memory array storing the CIS because of the separate address, data, and control unit used in this method.

The prior art's other CIS implementation methods such as the flash memory and the RAM storage methods require two separate devices (e.g., the flash memory and the microcontroller) which must be programmed during the assembly of the card to store the separate software needed for the flash memory and the microcontroller to function. Using two separate parts increases the cost of assembling the card and consumes additional board space, which in the PCMCIA card is very vital and limited due to the card's small dimensions and the lack of space on the card's printed circuit board.

Despite the specific drawbacks each of the prior art methods described above has, prior art PCMCIA cards have a common drawback of having a read-only access to the PCMCIA card's memory including the CIS information by the host computer. The inability of the host computer to write to the PCMCIA card's memory makes it impossible to upgrade the CIS information after the cards have been manufactured. Therefore, to maintain compatibility between the host computer and the PCMCIA card, the computer user must purchase a new card whenever the host computer is upgraded, which is expensive because PCMCIA cards are expensive. This cost tends to deter computer users from upgrading their systems.

To reduce implementation costs of the CIS and reduce power consumption by the PCMCIA card, a system is needed that allows the card user to upgrade the CIS without purchasing a new card.

SUMMARY OF THE INVENTION

The present invention provides an upgradable removable computer card that complies with the Personal Computer Memory Card International Association (PCMCIA) standards. The described embodiment includes a specialized random access memory (SPRAM) circuit for storing the CIS of the removable computer card (PCMCIA card). The SPRAM device has two operating modes: a first operating mode in which the SPRAM device provides a host computer system read-only access to the information contained in the special random access memory device, and a second operating mode which provides the host computer both read and write access to the information contained in the special random access memory device. For example, if the host computer has been upgraded with new devices or software that may impact the card, the host computer is able to upgrade the contents of the SPRAM device including the CIS when the SPRAM device is placed in the second operating mode.

A register control unit comprising a plurality of registers is provided to store information to control operation of the special random access memory device. During normal operation of the PCMCIA card, the registers are set to predetermined values to notify the host computer of the status of operation of the SPRAM device.

The described embodiment also includes a microcontroller subsystem which includes a microcontroller for controlling both read and write access requests to the SPRAM device by the host computer. The microcontroller loads the CIS into a first portion of the SPRAM device during the power up process of the host computer which includes reading the CIS from the SPRAM device. Once the CIS is loaded on the host, microcontroller execution is halted and the microcontroller is placed in a reduced power consumption state.

The dual operating modes provide for a substantial reduction in the amount of power consumed by the PCMCIA card because execution of the microcontroller is reduced when the PCMCIA card is in read-only mode. Furthermore, the dual operating modes enables the CIS to be upgraded without significant additional hardware, thereby providing for a cost effective way of eliminating the need to purchase a new card with each upgrade.

DETAILED DESCRIPTION OF THE PREFERRED EMBODIMENT

FIGS. 1 through 8 of the drawings disclose various embodiments of the present invention for purposes of illustration only. One skilled in the art will readily recognize from the following discussion that alternative embodiments of the structures and methods illustrated herein may be employed without departing from the principles of the invention.

The following description first describes the preferred embodiment in general terms, with reference to the figures. Subsequent to the general description, a specific description describes more particular aspects, again with reference to the figures. Throughout the description and the figures, like parts are designated with like numerals. The following notation has been adopted for indicating signals. Since the terms "1" and "0" and "true" and "false" can be ambiguous, their use is avoided. In their place the terms "high" or "low" in association with "asserted" and "deasserted" states for the signals have been used. A pound sign (#) following a signal indicates that signal is "asserted" when low.

Overview of the Computer System

Figure 1:
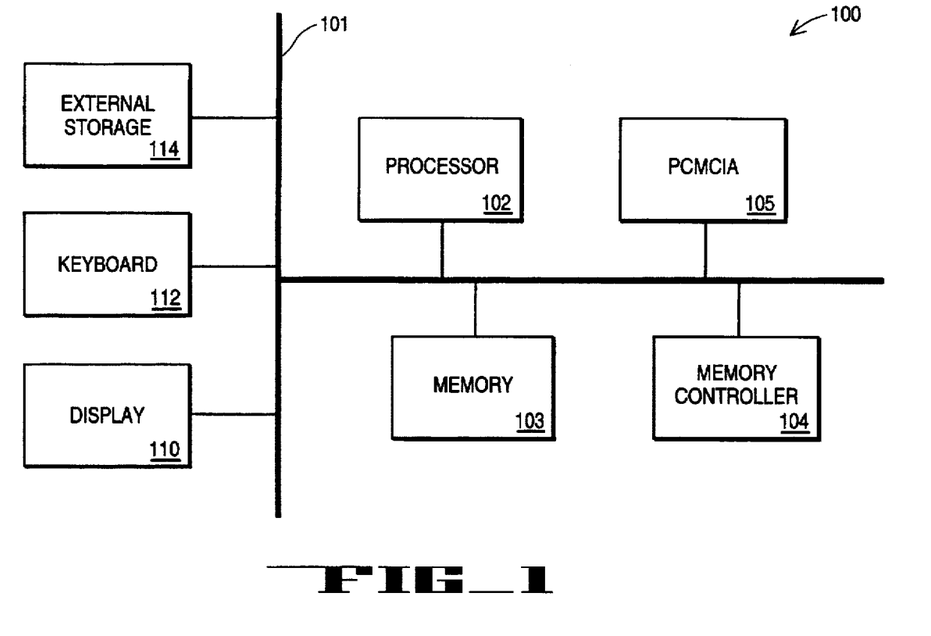
FIG. 1 is a block diagram illustrating an overview of a computer system utilized in one embodiment of the present invention.

Reference is first made to FIG. 1 which is a block diagram illustrating a computer system of the present invention. As illustrated in FIG. 1, the computer system 100 of the present invention generally comprises a bus 101 for communicating information, a processor 102 coupled to the bus 101 for processing instructions, a main memory 103 coupled to the bus 101 for storing data and instructions for the processor 102, and a memory controller 104 also coupled to the bus 101 for controlling access to the main memory 103. A removable computer card 105, which complies with the Personal Computer Memory Card International Association (PCMCIA) standards, is also shown coupled to the bus 101 for supporting specific applications in the computer system 100, such as modem/fax and local area network support.

The computer system also includes a display device 110 coupled to the bus 101 for displaying information to the computer user, an alphanumeric input device 112 coupled to the bus 101 for communication information and command selections to the processor 102, and a storage device 114 also coupled to the bus 101 for storing data for the computer system 100.

Figure 2:
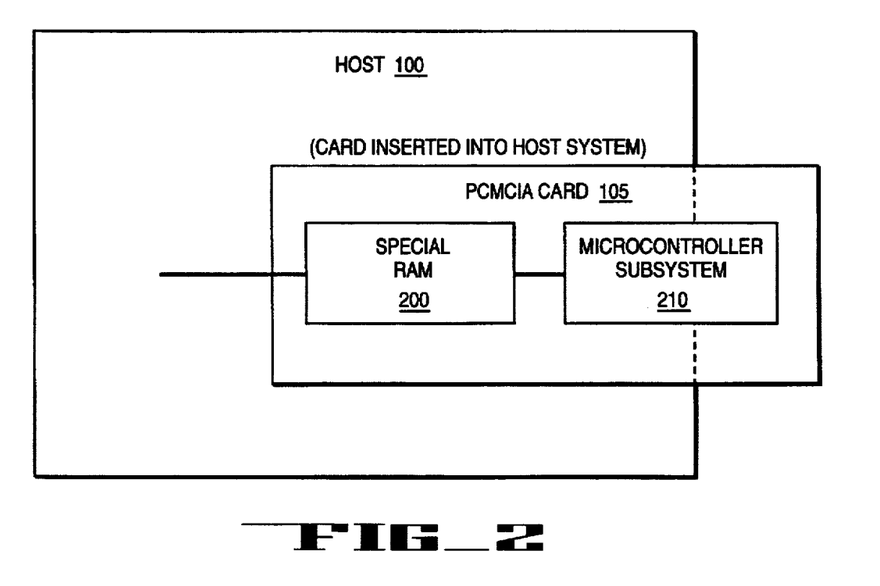
FIG. 2 is a block diagram illustrating one embodiment of the Personal Computer Memory Card International Association (PCMCIA) card of one embodiment of the present invention including a special random access memory device (SPRAM) and microcontroller unit.

Reference is now made to FIG. 2, which is a block diagram illustrating one embodiment of the PCMCIA card 105. As illustrated, the PCMCIA card 105 includes a PCMCIA interface application specific integrated circuit (ASIC) 200 which includes a specialized random access memory (SPRAM) device 205 and a card microcontroller 210. The CIS of the PCMCIA card 105 is loaded and stored in the SPRAM during the boot-up and operating the host computer 100. The SPRAM 205 also includes multiple data and control lines that are selected by the host 100 to request data from the PCMCIA card 105. The SPRAM 205 further includes a control registers unit comprising a plurality of registers (shown in FIG. 4) with access control data therein which are set by the microcontroller 210. The access data is used to control access requests from either the microcontroller 210 or the host computer 100 to the SPRAM 205. A detailed description of the SPRAM 205 is provided in the discussion referencing FIG. 4.

The PCMCIA card 105 also includes the microcontroller 210 which controls access requests to the SPRAM 205. The microcontroller 210 includes a non-volatile program memory for permanently storing the CIS when the PCMCIA card 105 is not in operation. There are two modes of operation of the PCMCIA card 105: i) a normal mode of operation and ii) a special mode of operation. In the normal mode of operation, the PCMCIA card 105 allows only read access by the host computer 100 to the SPRAM 205. In the special operating mode, the host 100 is allowed to perform both read and write accesses to the SPRAM 205.

In the normal mode of operation, the microcontroller 210, begins execution of initialization routines supplied by the host computer's BIOS during the boot-up of the host computer 100. The microcontroller 210 sets the control registers in the SPRAM 205 to enable the microcontroller 210 to access the SPRAM 205. After setting the SPRAM control registers, the microcontroller 210 loads the CIS contents from a table in the microcontroller's program memory to a first portion of the SPRAM 205. The microcontroller 210 subsequently asserts an access control signal to the SPRAM 205 which enables the host computer to perform read operations to the SPRAM 205. After the microcontroller 210 has asserted the access control signal to the SPRAM 205, the microcontroller 210, through a handshaking protocol with the host computer 100, notifies the host computer 100 that the SPRAM 205 is ready to be accessed. In the preferred embodiment of the present invention, the microcontroller 210 is placed in a reduced power consumption state after the CIS has been loaded into the SPRAM 205 by halting execution of the microcontroller 210 and powering down the microcontroller 210. The microcontroller 210 is powered up again when the host computer 100 asserts a Host random access memory/read only memory (host RAM/ROM) signal and sets a command bit in a command register in the SPRAM control registers unit to request access to the SPRAM 205.

The host computer 100 initiates a read access request to the PCMCIA card by asserting the host RAM/ROM signal to the SPRAM 205. The host RAM/ROM signal is by default asserted every-time the host computer is initialized to allow the host computer to read the CIS information in the SPRAM 205. While the host RAM/ROM signal is asserted, the host can only perform read operations to the SPRAM 205. The SPRAM control registers and the command register are described in detail with reference to FIGS. 4 and 6 respectively.

The SPRAM 205 transitions into a special operating mode when the computer user inputs an upgrade command into the host computer 100 to upgrade the CIS. The host computer 100 subsequently issues the upgrade command to the microcontroller 210 and deasserts the host RAM/ROM signal to initiate a write request to the SPRAM 205. After the host RAM/ROM signal has been deasserted, the host asserts a host write enable signal to begin driving data on a host DATin bus to the SPRAM 205. In the special operating mode, the microcontroller 210 executes an unlock logic routine upon receiving the upgrade command from the host computer 100, to enable the SPRAM 205 internal registers to allow the host computer 100 to write the SPRAM 205. The unlock logic routine of the preferred embodiment is described in detail in FIG. 8.

Figure 4:
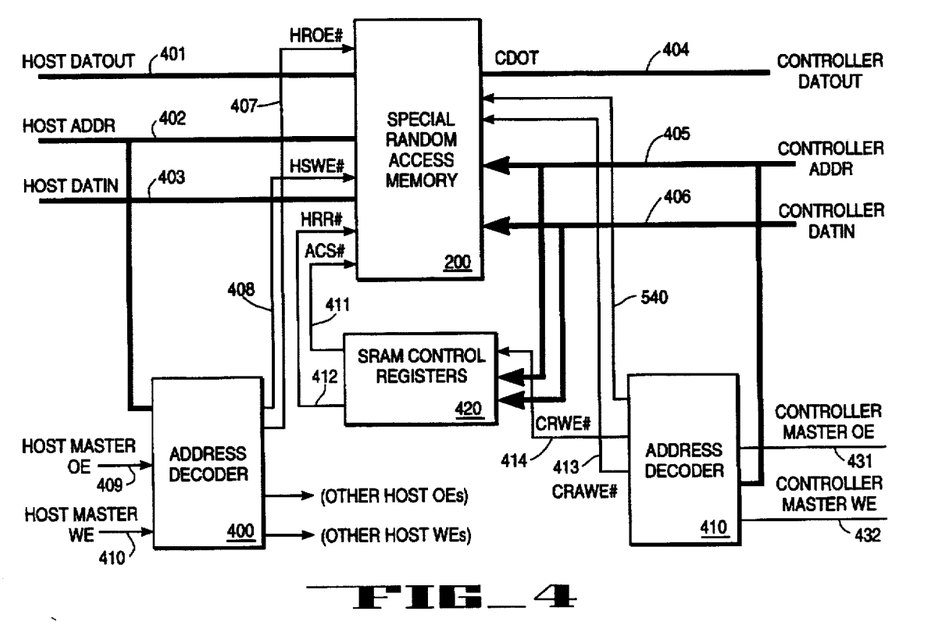
FIG. 4 is a block diagram illustrating the internal circuitry of the PCMCIA card including the SPRAM and an SPRAM control register unit.

FIG. 4 is a block diagram illustrating the internal circuitry of one embodiment of the PCMCIA card 105 of the present invention. As illustrated in FIG. 4, the circuit comprises the SPRAM 205. Preferably, the SPRAM 205 includes a general purpose one-port 256 byte non-volatile random access memory device and additional circuitry described in more detail with reference to FIG. 5. The SPRAM 205 receives inputs such as a host ADDR bus 402, a host DATin bus 403, a controller ADDR bus 405, and a controller DATin bus 406. The host ADDR bus 402 receives the address of a memory request from the host computer 100, and the DATin bus 403 receives data from the host computer 100 to be written to the SPRAM device 205. The controller ADDR bus 405 receives the address of a memory request from the microcontroller 210 and the controller DATin bus 406 receives data to be written to the SPRAM device 205.

The SPRAM 205 further receives input signals such as a host RAM output enable (HROE#) signal 407, a host SPRAM write enable (HSWE#) signal 408, an access control (ACS#) signal 411, a host RAM/ROM(HRR#) signal 412, and a controller RAM write enable (CRAWE#) signal 413. The host random access memory output (HROE#) signal 407 is asserted by the host 100 to perform a read operation to the SPRAM 205, the HSWE# signal 408 is asserted by the host 100 via the address decoder 400, which decodes the address location in the SPRAM 205, to perform a write operation to the SPRAM 205. The ACS# signal 411 is asserted/deasserted when the microcontroller 210 sets an access control register in an SPRAM control register unit to enable read and write access by the host 100 to the SPRAM 205 and the HRR# signal 412 is asserted when the host 100 sets the access control register in the SPRAM control register unit to initiate a read operation to the SPRAM 205 and is deasserted to initiate a write operation to the SPRAM 205. The CRWE# signal 414 is asserted by the microcontroller 210 via the address decoder 410 during a write operation to the SPRAM 205, the Control Master Output Enable (CMOE) signal 431 is asserted by the microcontroller 210 via the address decoder 410 during a read operation from the SPRAM.

The SPRAM 205 provides outputs on a host DATout bus 401 and a controller DATout bus 404 to the host 100 and the microcontroller 210, respectively. The host DATout bus 401 transmits data from the SPRAM 205 to the host 100 and the controller DATout bus transmits data from the SPRAM 205 to the microcontroller 210.

The PCMCIA internal circuitry also includes an SPRAM control register unit 420. The SPRAM control register unit 420 includes a plurality of registers that are set to control the status and access requests to the SPRAM 205. Included in these plurality of registers is an 8-bit general purpose status register (shown in FIG. 7), an 8-bit command register (shown in FIG. 6), and an access control register. All exchanges (handshaking protocol) between the host computer 100 and the microcontroller 210 are handled by the status register which is set by either the host 100 or the microcontroller 210, as is discussed in more detail with reference to FIG. 7. The command register stores command issued by the host 100 to the microcontroller 210 as is discussed in more details with reference to FIG. 6. These commands are subsequently executed by the microcontroller 210 after the host 100 has set the command register. Since the SPRAM 205 allows both the host computer 100 and the microcontroller 210 simultaneous access to the control registers, the control registers can be set by either the host or the microcontroller in order to avoid register race access conditions in the SPRAM 205. In normal operation of the SPRAM 205, the microcontroller 210 sets the registers in the SPRAM control register unit 420 to restrict the host computer 100 from writing to the SPRAM 205.

The SPRAM control register unit 420 receives inputs such as the controller ADDR bus 405 for transmitting address requests from the microcontroller 210 to the SPRAM 205, the controller DATin bus 406 for transmitting data from the microcontroller 210 to the SPRAM 205, and the CRWE# signal 414 which is asserted by the microcontroller 210 to initiate write operations to the SPRAM 205. The SPRAM control register unit 420 provides outputs such as the ACS# signal 411 which is asserted when the microcontroller 210 sets the access control register to enable and disable write operations by the host computer 100 to the SPRAM 205 and the HRR# signal 412 which is asserted when the host 100 sets the access control register to perform read and write operation to the SPRAM 205.

The PCMCIA internal circuitry further includes a plurality of address decoders 400 and 410 for decoding address requests to the SPRAM 205 from the host computer 100 and the microcontroller 210 respectively.

Described below in detail are the signals and buses utilized by the host computer 100, the SPRAM 205 and the microcontroller 210 during a read and write cycle operation from the host computer 100 and the microcontroller 210 to/from the SPRAM 205.

The host data out bus (HDOB) 401 couples the host computer 100 to the SPRAM 205 to transmit data from the SPRAM 205 to the host computer 100.

The host address bus (HADDR bus) 402 is a unidirectional address bus which couples the host computer 100 to the SPRAM 205. The bus's address lines are decoded along with other host control signals to read or write data to/from the host data bus into/out of the SPRAM 205, the control register unit 420, or other storage devices in the computer system. In the preferred embodiment, the address lines in the HADDR bus 402 are decoded along with the host Master write enable signal to generate a write enable signal for the SPRAM 205, and similarly some address lines are decoded along with a Host Master output enable signal to generate a specific output enable signal to the SPRAM 205.

The host data-in bus 403 couples the host computer 100 to the SPRAM 205 to transmit data from the host 100 to the SPRAM 205.

The host random access memory signal (HROE# signal) 407 is asserted by the host 100 whenever a HMOE# signal 409 is asserted, and whenever the address value on the HADDR bus 402 matches the address value for the SPRAM 205. If the HMOE# signal 409 is asserted, but the address value does not match, the HROE# signal 407 is not asserted.

The host RAM write enable (HSWE#) signal 408 is asserted by the host 100 whenever the HMWE# signal 410 is asserted, and when the value on the host address bus 402 matches an address value for the SPRAM 205. If the HMWE# signal 410 is asserted, but the address value does not match, the HSWE# signal 408 is not asserted.

The Host Master Output Enable signal 409 (HMOE#) is driven whenever the host computer 100 intends to perform a read operation to the SPRAM 205. During read operations, data from a specific SPRAM 205 location or SPRAM control register 420 location whose address matches the value on the host address bus is driven on the HDOB bus 401 to the host computer 100.

The host master write enable signal (HMWE#) 410 is driven whenever the host 100 intends to perform a write operation. During write operations, data from the host 100 is passed onto the HDIN bus 403 to be written into a specific SPRAM 205 location whose address matches the value specified on the HADDR bus 402.

The access control signal (ACS#) 411 is an internal signal generated by the SPRAM control register unit 420. When the microcontroller 210 provides an appropriate address to the SPRAM 205, the Controller Master Write Enable (CMWE) signal 432 is asserted, subsequently the value on the microcontroller's data bus 406 is written into the SPRAM control register unit 420 which becomes the ACS# 411. The address value is then latched into the register unit 420 until a subsequent write to the same address by the microcontroller 210. The set bit value is also used to control which side (host 100 or microcontroller 210) has access to the SPRAM 205 at any one time.

The Host RAM/ROM (HRR#) signal 412 is an internal control signal generated out of the SPRAM control register unit 420. When the microcontroller 210 provides an address to the SPRAM 205, the CMWE# signal 432 is asserted, then the value of the data on the microcontroller data bus 406 is written into the SPRAM control register unit 420 and becomes the HRR# 412. The data value is then latched in the SPRAM control register 420 until a subsequent write to the same address by the microcontroller 210. The data value is also used to control write accesses of the host 100 into the SPRAM 205. If the value is not asserted, the host's 100 write operations into the SPRAM 205 are blocked, and will have no effect on the SPRAM 205.

The microcontroller random access memory (CRAWE#) signal 413 is asserted by the microcontroller 210 to the SPRAM 205 whenever the CMOE# signal 431 is asserted and when the value on the microcontroller's address bus 405 matches an address value for the SPRAM 205. If the CMOE# signal 431 is asserted, but the address value does not match, the CRAWE# signal 413 is not asserted. Instead, the controller register write enable (CRWE#) signal 414 may be asserted if the value on the microcontroller's address bus 405 matches the requirements of another circuit in the PCMCIA card 105.

The CRWE# signal 414 is asserted by the microcontroller 210 whenever the CMWE# signal 432 is asserted and the address value on the microcontroller's address bus 405 matches the address value for the SPRAM control register unit 420. If the CMWE# signal 432 is asserted, but the address value does not match that in the SPRAM 205, the CRWE# 414 is not asserted.

The controller master output enable (CMOE#) signal 431 is driven whenever the microcontroller 210 intends to perform a read operation. During read operations, data from a specific the SPRAM 205 location whose address matches the value on the microcontroller's address bus is placed on the microcontroller's data out (CDOT) bus 404 which is enabled and transmitted on to the bi-directional microcontroller data bus.

Figure 5:
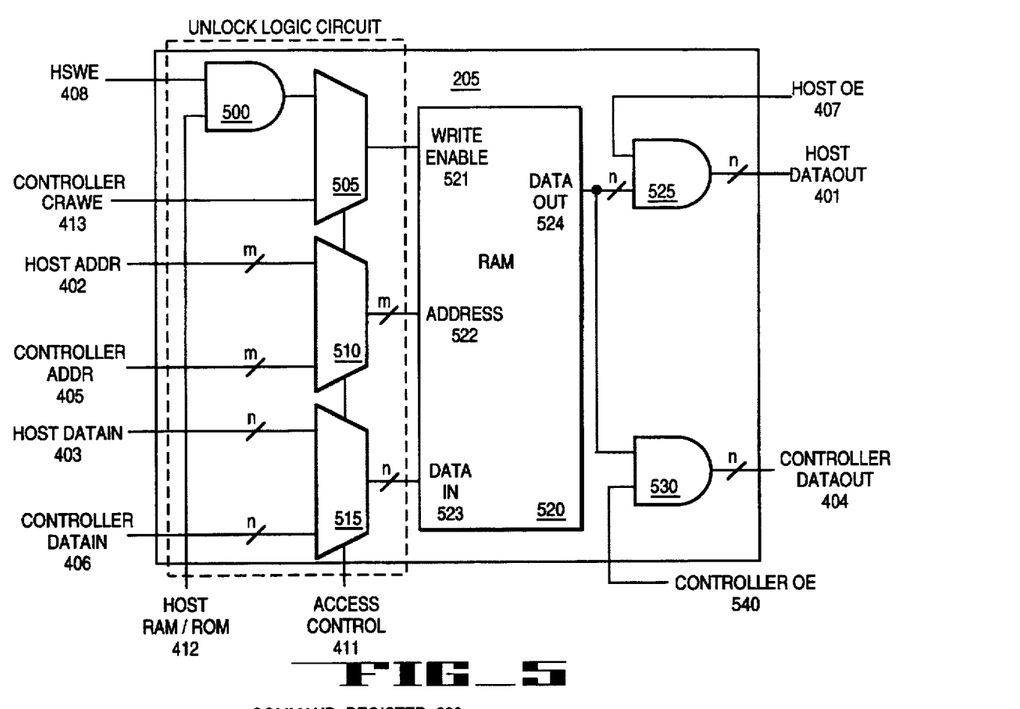
FIG. 5 is a block diagram illustrating one embodiment of the logic circuitry of the SPRAM of the PCMCIA card.

FIG. 5 is a block diagram that illustrates the logic circuitry for one embodiment of the SPRAM 205. The logic circuitry includes multiplexors 505, 510, and 515 which couple to a RAM 520 to control address and data requests from the host 100 and the microcontroller 210 to the SPRAM 205. The logic circuitry also includes an AND gate 500 which is coupled to the RAM 520 which preferably is a general purpose one-port 256 byte non-volatile random access memory device to allow data to be passed by either the host computer 100 or the microcontroller 210 to the RAM 520, and AND gates 525 and 530 which are coupled to the RAM 520 to send requested data out to the host computer 100 and the microcontroller 210 respectively.

As illustrated in FIG. 5, the AND gate 500 receives as its inputs the host output enable signal 409 and the HRR# signal 412 which are both asserted by the host computer 100 to initiate a write operation to the RAM 520. The AND gate 500 provides an output signal to the multiplexor 505.

The multiplexor 505 receives as its inputs the output signal provide by the AND gate 500, the CRWE# signal 414 which is asserted by the microcontroller 210 to initiate a write operation to the RAM 520, and the ACS# signal 411 which is asserted by the microcontroller 210 to control access requests by the host 100 to the RAM 520. The multiplexor 505 provides an output signal to the write enable input 521 of the RAM 520 to allow either the host 100 or the microcontroller 210 to write to the RAM 520. If the ACS# 411 is asserted, the output provided by the multiplexor 505 is the write request by the microcontroller 210 to the RAM 520 and if the ACS# signal 411 is deasserted, the output signal provided by the multiplexor 505 is the write request from the host computer 100.

The multiplexor 510 is coupled to the RAM 520 to receive addresses from the host address bus 402 and the controller address bus 405. The multiplexor 510 also receives the ACS# signal 411 from the SPRAM control register unit 420 and provides an output signal to the address input 522 of the RAM 520. When the ACS# signal 411 is asserted, the output signal provided by the multiplexor 510 is the address being driven by the microcontroller 210 to the RAM's address input 522. Alternatively if the ACS# signal 411 is deasserted, the address signal provided by the multiplexor 510 is the address driven by the host computer 100.

The multiplexor 515 is coupled to the RAM 520 to receive data from the host data bus 403 and the controller data bus 406. The multiplexor 515 also receives as an input the ACS# signal 411 from the SPRAM control register unit 420. The multiplexor 515 provides an output signal to the RAM's data-in input 523. When the ACS# signal 411 is asserted by the microcontroller 210, the output provided by the multiplexor 515 to the RAM 520 is the data driven on the microcontroller's data bus 406 and alternatively if the ACS# signal 411 is deasserted, the output provided by the multiplexor 515 is the data being driven on the host computer's data bus 403.

Still referring to FIG. 5, the RAM 520 provides a data-out output 524 for passing data from the RAM 520 to the host 100 via AND gate 525 and to the microcontroller 210 via AND gate 530 during a read operation by either the host 100 or the microcontroller 210.

The AND gate 525 receives as its inputs the data out signal provided by the RAM 520 and the host output enable signal 409 which are both asserted when data is being transmitted to the host computer 100. The AND gate 525 provides the requested data via the host data-out bus 401 to the host 100.

The RAM 520 also provides an output signal which is received as one of the inputs of the AND gate 530. The AND gate 530 also receives as another input a controller output enable signal 431 which is asserted when data is being transmitted from the RAM 520 to the microcontroller 210. The AND gate 530 provides the requested data by the microcontroller 210 via the controller data-out bus 404 from the RAM 520.

As an illustration of how the circuitry shown in FIG. 5 operates, the host computer 100 begins a write cycle by placing an address and data on the host address bus 402 and asserting the HSWE# signal 408 to write to the SPRAM 205. When the host computer asserts the HSWE# signal 408, the microcontroller 210 asserts the access control signal 411 to enable the host to access the SPRAM 205. Upon detecting that the access control signal 411 has been asserted, the host computer 100 drives data on the host DATin bus 403 to the SPRAM 205.

The HRR# signal 412 which also is asserted by the host computer is logically AND'ed with the HSWE# signal 408 in the AND gate 500 to generate an output signal to the multiplexor 505. The multiplexor 505 also receives as one of its inputs the deasserted Control Random Access Write Enable (CRAWE) signal 413 from the microcontroller and the deasserted control access signal 411. The multiplexor 505 generates an output signal to the write enable input 521 of the RAM 520 to enable the host 100 to begin writing to the RAM 520. Since the SPRAM 205 allows both the controller 210 and the host computer 100 to write to it, when the output signal from the multiplexor 505 is asserted, the CWE# signal 413 is deasserted to indicate that only the host 100 can write to the RAM's write enable input 521. Once the write enable input 521 is activated in the RAM 520, the host computer 100 begins to write data to the specified RAM 520 location via the DATA IN input 523 of the RAM 520.

During a read operation by the host computer 100, the memory controller 210 asserts the access control signal 411 and deasserts the HRR# signal 412 to prevent the host 100 from writing to the SPRAM 205. However, the host 100 can still read from the SPRAM 205. The host 100 drives an address of the SPRAM 205 to be read on the host address bus 402 to the multiplexor 510. The multiplexor 510 has as one of its inputs the controller address bus 405 from the microcontroller 210. Because there is no address being driven on the controller address bus 405 during a read cycle to the SPRAM 205 by the host computer 100, the multiplexor's output is the address presented by the host computer 100. When the address is presented to the SPRAM 205, the RAM 520 responds by driving the requested data from the RAM 520 that matches the address presented, out through its DATA OUT output 524 onto the data line to the AND gate 525 and the AND GATE 530. The AND gate 525 has as its inputs the Host Random Output Enable (HROE) signal 409, which is asserted by the host 100 once the SPRAM 205 is ready to transmit data and logically AND'ed with the data out signal from the RAM 520. The output of the AND gate 525 is driven out on the Host Data Out Bus (HDOB) bus 401 to the host computer 100 to complete the read cycle.

Figure 6:
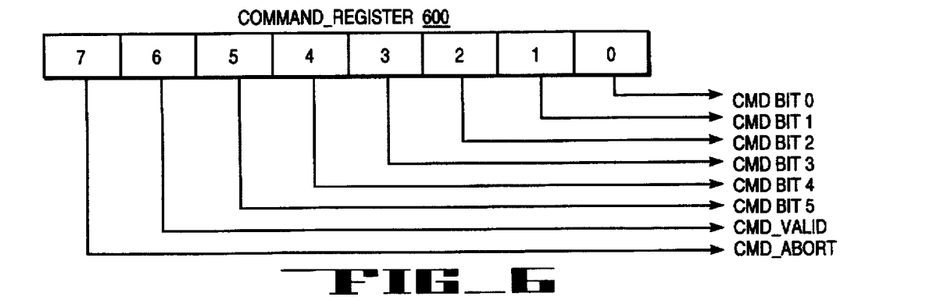
FIG. 6 is a block diagram illustrating one embodiment of the structure and contents of a COMMAND_REGISTER of the microcontroller of the PCMCIA card.

FIG. 6 is a block diagram illustrating one embodiment of the command register included in the SPRAM control register unit 420. The COMMAND_REGISTER 600 comprises a sequence of command bits that indicate commands issued by the host computer 100 to the microcontroller 210. The host computer 100 issues a command to the microcontroller 210 by writing to the 8-bit COMMAND_REGISTER 600 in the control register unit 420. The microcontroller 210 executes the commands in the COMMAND_REGISTER 600 and resets the register.

As illustrated in FIG. 6, bit seven is only set when the host wishes to abort the current command being processed. Bit six is always set to indicate the command has been issued and is currently valid.

Bits five through zero are set to define specific commands that are executed by the microcontroller 210. An example of such commands includes a lock which is a default command that keeps the SPRAM 205 write enable input disabled for write operations during normal read operations and the unlock command which enables the SPRAM 205 for write operations.

Figure 7:
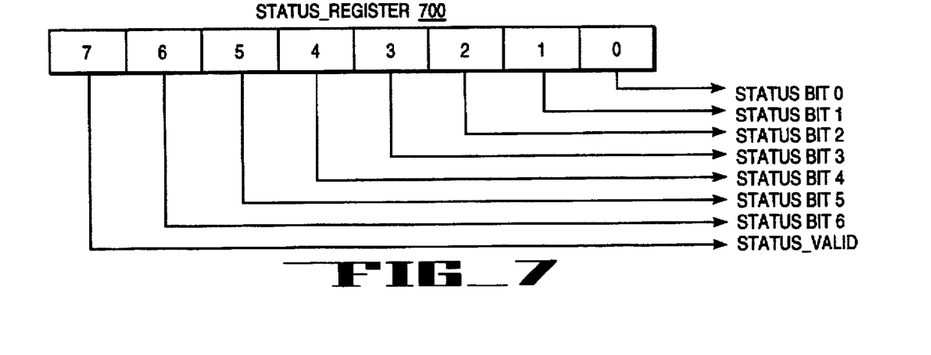
FIG. 7 is a block diagram illustrating one embodiment of the structure and contents of the STATUS_REGISTER of the microcontroller of the PCMCIA card.

The host computer 100 communicates with the microcontroller 210 by issuing a command to the microcontroller 210 using the handshaking protocol of the preferred embodiment. After the command is detected, the microcontroller 210 executes the code that implements the requested command and signals the host 100 upon completion by writing a status value into a STATUS_REGISTER 700 in the SPRAM control register unit 420. After writing a command to the microcontroller 210, the host 100 simply waits for the microcontroller 210 to complete the requested command.

FIG. 7 is a block diagram illustrating one embodiment of the STATUS_REGISTER 700 included within the SPRAM 205. As illustrated, the STATUS_REGISTER 700 is an 8-bit register in the SPRAM control register unit 420. Any handshaking that occurs between the host computer 100 and the microcontroller 210 is provided by reading and writing to the STATUS_REGISTER 700. All exchanges start with the host 100 requesting service from the microcontroller 210 by clearing or resetting the STATUS_REGISTER 700 and issuing a command to the microcontroller 210 via a command register in the SPRAM control register unit 420. After executing the requested command, the controller 210 signals the host 100 by writing a status value to the STATUS_REGISTER 700. The host 100 then signals the microcontroller 210 to indicate the end of an exchange by clearing and resetting the STATUS_REGISTER 700. Examples of status values in the STATUS_REGISTER 700 include a Command_Complete value which is set to indicate the successful completion of a command, an Abort_Complete value, which indicates that the current command is aborted, and the Ram_Unlock value, which indicates that the SPRAM 205 is enabled for write operations.

Figure 8:
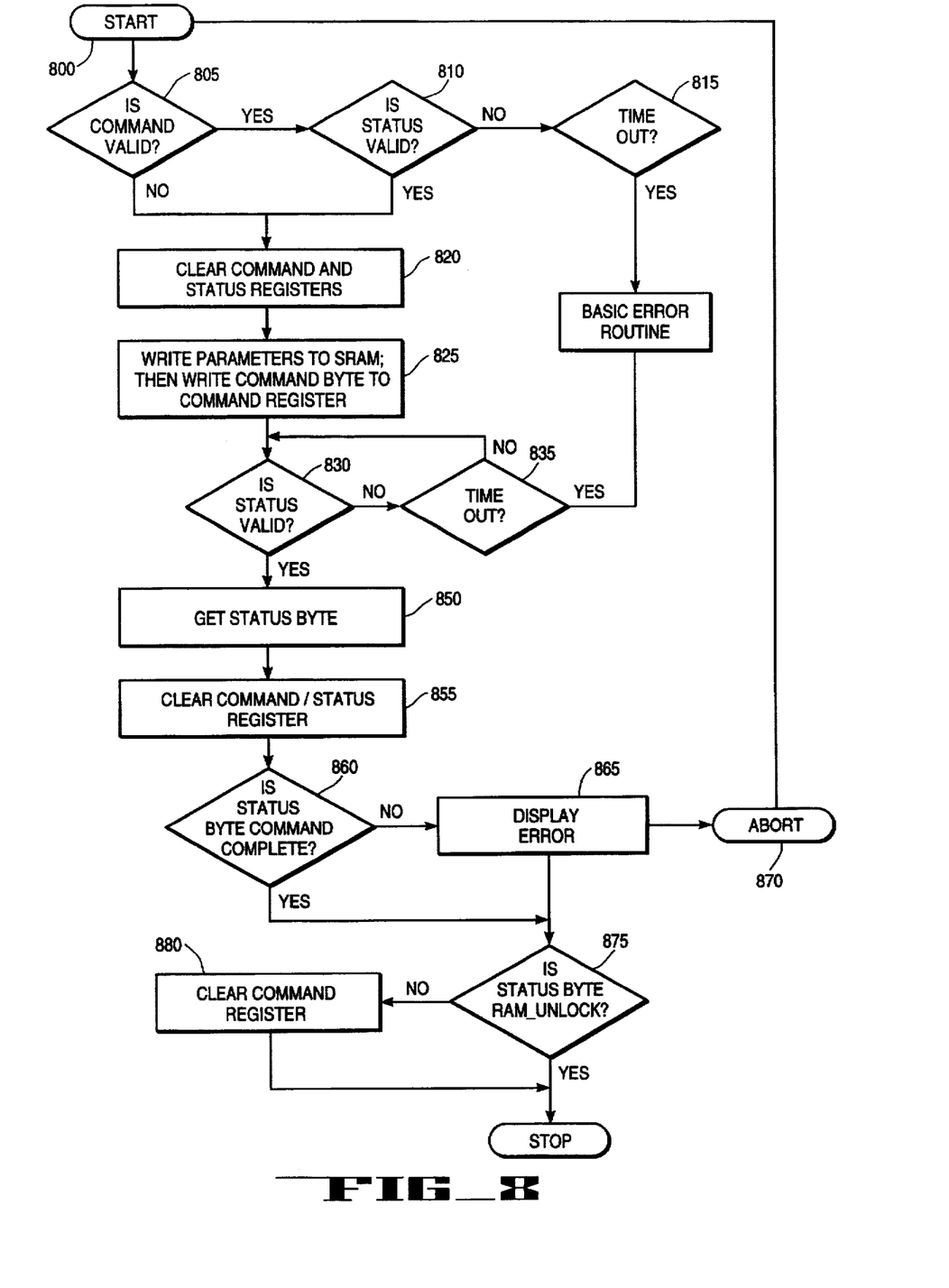
FIG. 8 is an exemplary flow chart illustrating the unlock command that unlocks the SPRAM to enable write operations by the host computer to the SPRAM of the PCMCIA card.

FIG. 8 is a flow chart of the unlock logic routine which enables the SPRAM 205 for write operations. The write enable input 521 of the SPRAM 205 is by default always disabled to prevent write operations until the unlock command is executed by the microcontroller 210. As illustrated at box 800, the unlock logic function of the preferred embodiment starts with the host computer 100 executing an unlock command to microcontroller 210 to enable the SPRAM 210.

At box 805, the host computer 100 checks the CMD_VALID bit 6 in the command_register 600 to insure that no command is currently in progress. If there is a current command in progress (i.e., CMD_VALID is set high), the host waits at box 810 until the STATUS_VALID bit 7 in the STATUS_REGISTER 700 goes high or a time out occurs at box 815, at which time the host attempts to abort the current command. Processing continues at box 820.

At box 820, if there is no command in progress in the COMMAND_REGISTER 600 and the Status_Valid bit 7 is set low in the STATUS_REGISTER, the host 100 clears the COMMAND_REGISTER 600 and the STATUS_REGISTER 700, and processing continues at box 825.

At box 825, after clearing both registers in box 820, the microcontroller 210 executes the code that implements the requested command and signals the host 100 upon completing by writing a value into the STATUS_REGISTER 700. The host 100 simply waits for the microcontroller 210 to complete the command request and processing continues at box 830.

At box 830, the host 100 checks the STATUS_REGISTER 700 to see if the status bit is asserted. The status bit is asserted to indicate that the microcontroller 210 has completed executing the last command (i.e., request for access to the SPRAM 205) or the time out at box 835 at which time the host 100 aborts and executes an error routine to handle the error condition at box 840, and processing continues at box 850.

At box 850, after the Status_Valid bit 7 is asserted at box 830, the host 100 retrieves the status byte and any pertinent information from the SPRAM control register 420. The host 100 then clears the COMMAND_REGISTER 600 and the STATUS_REGISTER 700 at box 855, signaling the microcontroller 210 that the command handshake protocol has completed and processing continues at box 860.

At box 860, the host 100 checks to see if the receipt of the status byte command is complete. If the command is complete, processing continues at box 875, otherwise; processing continues at box 865 where the host 100 displays the error in the status command on the host's 100 display screen, and subsequently aborts the write operation at box 870.

At box 875, if the host 100 receives a complete status command byte at box 860, the host 100 checks to determine if the received byte is the RAM_Unlock byte. If the received byte is the RAM_Unlock byte, the host 100 begins to write data to the SPRAM 205 and clears the command_register at box 880 after the write to the SPRAM 205 is completed. If the status byte received from box 850 is not the RAM_Unlock byte, the host 100 displays the error condition on its screen and aborts the write operation.

Thus a method and apparatus for upgrading the Card Information Structure contents of a PCMCIA card has been described. In describing the invention, reference has been made to a preferred embodiment. However, those skilled in the art and familiar with the disclosure of the invention may recognize additions, substitutions, or other modifications which would fall within the purview of the invention. It is the Applicant's intention in the following claims to cover all equivalent modifications and variations as falling within the scope of the invention.

What is claimed is:

1. A removable computer card including stored Card Information Structure (CIS) information that defines an interface with said card in a computer system, comprising:

(a) a specialized single port random access memory (SPRAM) device having a first portion for storing said CIS information, and a second portion for storing data and instructions, said SPRAM device having a write enable input to allow write access to said first and said second portions, said SPRAM including an input for a host data bus;

(b) a plurality of control storage locations coupled to said SPRAM device, each having access control data stored therein; and (c) a controller coupled to said SPRAM device and said storage locations through a micro-controller databus, said controller controlling access requests by said computer system to said SPRAM device, and setting said control data in said storage locations responsive to said computer system to enable said computer system to read and write to said SPRAM device, said controller executing an unlock logic routine responsive to a write request by said computer system to enable said write enable input that allows said computer system to write to said SPRAM device and altering either said first portion or said second portion.

2. The computer card of claim 1, wherein said SPRAM device has a first mode in which said access control signal is asserted by said controller to allow said computer system read-only access to said SPRAM device, and a second mode in which said access control signal is deasserted to allow said computer system read and write to said SPRAM device.

3. The computer card of claim 1 further comprising a reset mechanism for resetting each of said plurality of control storage locations upon initially powering up each of said plurality of control storage locations.

4. The computer card of claim 1 wherein said controller includes circuitry that enables control data in a first of said plurality of said control storage locations to be set responsive to an access request by said computer system.

5. The computer card of claim 1 wherein said controller further includes circuitry that enables control data in a second of said plurality of said control storage locations to be set responsive to a write access to said SPRAM device by said computer system, said data indicating the current status of said SPRAM device.

6. The computer card of claim 1, wherein said first plurality of said storage locations includes a command register.

7. The computer card of claim 1 wherein said second plurality of said storage locations includes a status register.

8. The computer card of claim 1 wherein said controller further includes circuitry to provide control signals asserted responsive to access requests from said computer system to said SPRAM device, and wherein a first of said control signals is asserted to block write access to said SPRAM device by said computer system.

9. The computer card of claim 8, wherein a second of said control signals is asserted by said computer system to initiate a write access to said SPRAM device.

10. A removable computer card including stored Card Information Structure (CIS) information that defines an interface with said card in a computer system, comprising:
(a) a specialized single port random access memory (SPRAM) means for storing information under control of a processor in said removable computer card, the SRRAM means configured to receive input via a host data bus, the SPRAM means including a first portion for storing said CIS information, and a second portion for storing data and instructions for said computer system;
(b) control storage means for storing control access data, said control storage means being coupled to said SPRAM means via a microcontroller bus;
(c) control means for controlling access requests to said SPRAM means by said computer system, said control means being coupled to said control storage means and said SPRAM means; and
(d) an unlock logic means, responsive to write requests from said computer system, for enabling said computer system write to said SPRAM means.

11. The computer card of claim 10, wherein said SPRAM means has a first and a second operating mode, and wherein in said first mode said SPRAM means allows said computer system only read access to said first portion in said SPRAM means, and in said second mode, said computer system reads and writes to said first and said second portion in said SPRAM means.

12. The computer card of claim 10 further comprising a reset means for resetting each of said plurality of control storage means upon initially powering up each of said plurality of control storage means.

13. The computer card of claim 10 wherein said control means includes a setting means for enabling a first of said plurality of said storage means to be set responsive to an access request by said computer system.

14. The computer card of claim 10 wherein said first plurality of said storage means is a command register, and a second of said plurality of said storage means is a status register.

15. The computer card of claim 10 wherein during a write access by said computer system to said SPRAM means, said computer system upgrades said CIS in said first portion of said SPRAM means.

16. The computer card of claim 10 wherein said control means includes a circuitry for providing control signals asserted responsive to requests from said computer system to said SPRAM means, and wherein a first of said control signals is asserted to disable write access to said SPRAM means by said computer system.

17. An upgradable removable computer card comprising:
(a) a specialized single port random access memory (SPRAM) device, under control of a processor in said removable computer card including a first and a second portion to contain configuration information and instructions for said card, said SPRAM device including
(a1) a random access memory (RAM) device including said first and second portions of said SPRAM device, said RAM device having a write enable input to enable write access to said first and second portions,
(a2) a first plurality of selectors coupled to said RAM device, said first plurality of selectors selecting address requests to said RAM device,
(a3) a second plurality of selectors coupled to said RAM device, said second plurality of selectors selecting data presented to said RAM device,
(a4) a third plurality of selectors coupled to said RAM device, said third plurality of selectors selecting control signals to said RAM device, and
(a5) a plurality of logic gates coupled to said RAM device, said plurality of logic gates logically selecting input and output signals to and from said RAM device;
(b) an SPRAM control registers unit coupled to said SPRAM device, said SPRAM control registers unit containing data to control and monitor said SPRAM device;
(c) a microcontroller subsystem coupled to said control registers unit, said microcontroller controlling access to said SPRAM device; and
(d) an unlock logic circuit, responsive to said computer system, to enable said computer system to write to said RAM device and replace or alter said configuration information and instructions for said card.

18. The card of claim 17 wherein said microcontroller subsystem includes circuitry for providing control signals which are asserted to enable and disable access requests to said SPRAM device.

19. The card of claim 17 wherein said control register unit includes a command register the contents of which are set to activate said SPRAM device to be accessed.

20. The card of claim 17 wherein said control register unit further includes a status register for monitoring the current status of said SPRAM device in order to determine whether said SPRAM device is accessible or inaccessible.

21. An upgradable removable thin form factor computer card containing configuration information, said card comprising:
(a) a specialized single port random access memory (SPRAM) device having a first and a second portion to contain upgradable configuration information and instructions for said card, said SPRAM device including
(a1) a random access memory (RAM) device comprising said first and second portions of said SPRAM device, said RAM device having a write enable input to enable write access to said first and second portions
(a2) a first plurality of selectors coupled to said RAM device, said first plurality of selectors selecting address requests to said RAM device, (a3) a second plurality of selectors coupled to said RAM device, said second plurality of selectors selecting data presented to said RAM device, (a4) a third plurality of selectors coupled to said RAM device, said third plurality of selectors selecting control signals to said RAM device, (a5) a plurality of logic gates coupled to said RAM device, said plurality of logic gates selecting input and output signals to and from said RAM device, and (a6) a plurality of address decoders coupled to said RAM device, said plurality of address decoders decoding addresses;

(b) an SPRAM control registers unit coupled to said SPRAM device, said SPRAM control registers unit containing data to control and monitor id SPRAM device;

(c) a microcontroller subsystem coupled to said control registers unit, said microcontroller subsystem controlling access to said SPRAM device; and (d) an unlock logic circuit, responsive to said computer system, to enable said computer system to write or replace CIS information in said RAM device.

22. A method for upgrading the memory contents of a removable computer card having a specialized single-port random access memory device (SPRAM) for storing configuration information (CIS) while said card is in operation and a microcontroller for controlling access to said SPRAM device in a host computer, comprising the steps of:

(a) issuing a write request to said SPRAM device by said host computer via a first bus;

(b) setting data in a status register in said SPRAM device responsive to said write request;

(c) asserting an access control signal by said microcontroller via a second bus, to allow said write access by said host computer to said SPRAM device;

(d) executing an unlock routine by said microcontroller to enable said write access to said SPRAM; and (e) writing data from said host computer via the first bus to write CIS information into said SPRAM device.

23. The method in claim 22 wherein said step (c) includes the step of asserting a host random access memory/read only memory signal by said host computer to initiate said write access to said SPRAM device.

24. The method claim of claim 22 wherein said step (d) includes the step of enabling a write enable input of said SPRAM device to allow said computer system to write said CIS.

25. The method of claim 22 wherein said step (a) further includes setting data in a command register in said SPRAM device by said microcontroller to indicate the type of command being executed by said host computer.

* * * * *